March 19, 1957 R. T. JONES 2,785,616
DRAFT RESPONSIVE, PENETRATION CONTROL MECHANISM
FOR TRACTOR CARRIED SOIL WORKING IMPLEMENTS
Filed Oct. 5, 1953 2 Sheets-Sheet 1
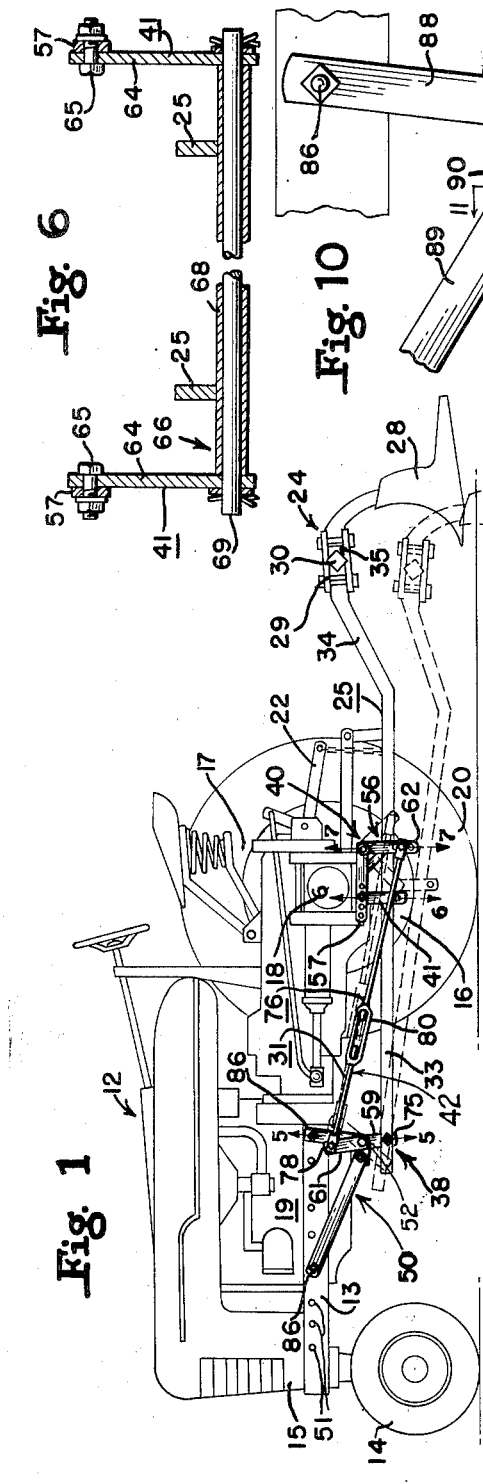
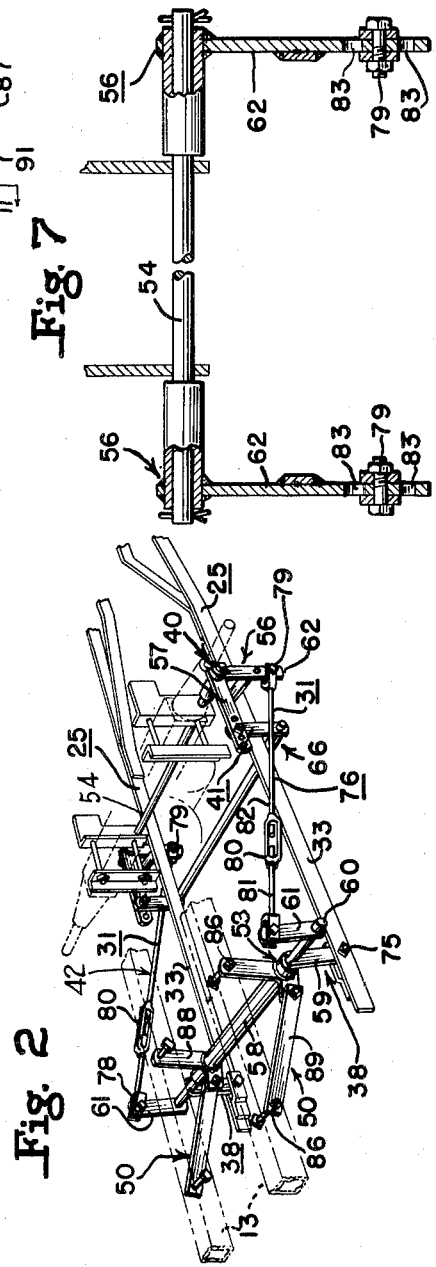
INVENTOR
Richard T. Jones
BY
ATTORNEYS

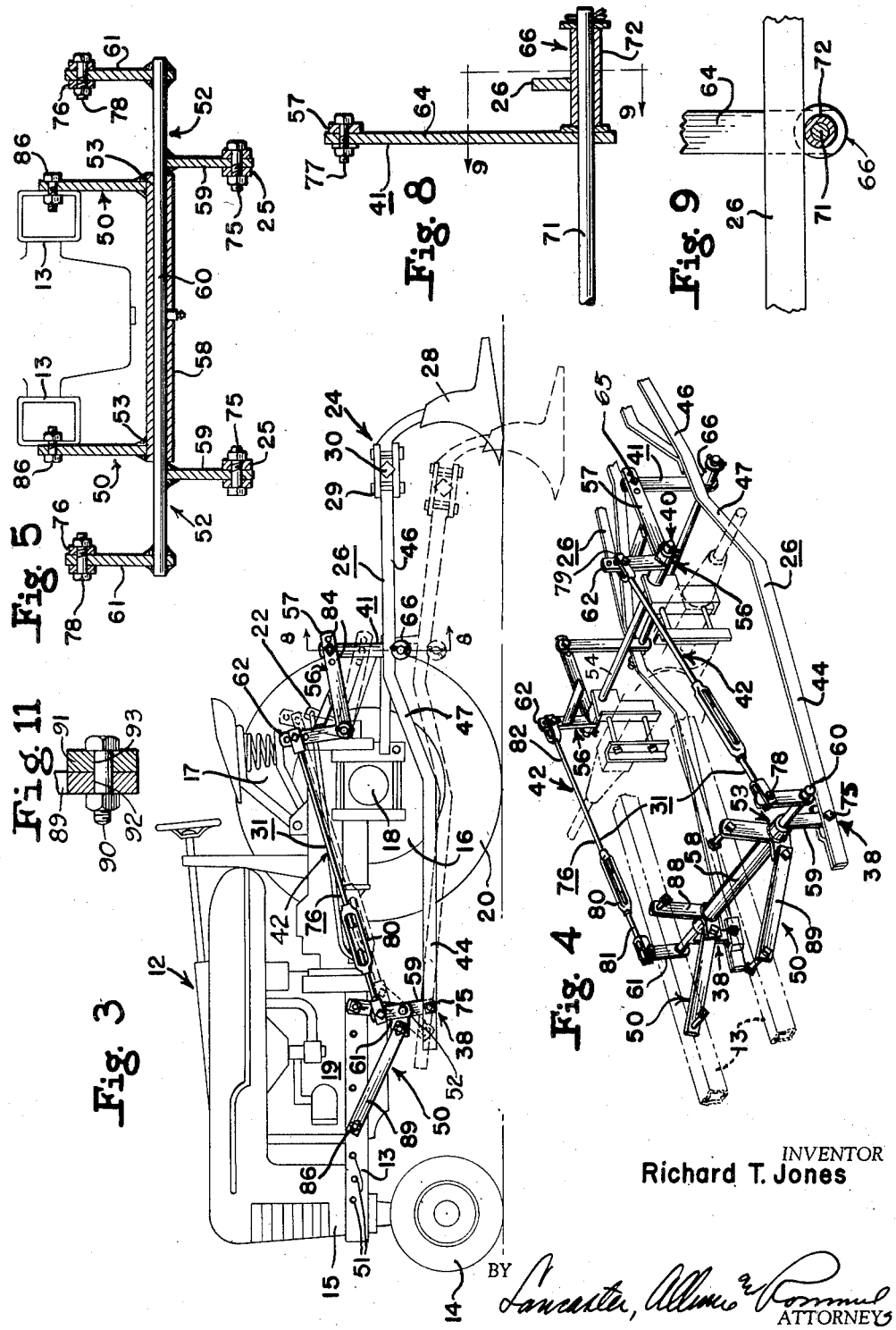

United States Patent Office 2,785,616
Patented Mar. 19, 1957

2,785,616

DRAFT RESPONSIVE, PENETRATION CONTROL MECHANISM FOR TRACTOR CARRIED SOIL WORKING IMPLEMENTS

Richard Tilton Jones, Seagraves, Tex., assignor of one-half to Donald E. Williams, Seagraves, Tex.

Application October 5, 1953, Serial No. 384,054

5 Claims. (Cl. 97—46.93)

This invention relates to penetration control mechanism for farm tractor carried soil working attachments of the types drawn forwardly by beams pivotally connected to the forward portions of the tractors and trailing to the rear portions thereof, such as moldboard and disk plows, tool-bar lister planters and lister cultivators, beet pullers etc., of the types where the downward and forward thrust of the implement has a tendency to bury itself in the ground.

The principal object of the invention is to provide penetration control mechanism carried by the tractor and associated with beams of the character described, which may be adjusted to cause the soil working implements to penetrate the soil at substantially predetermined, uniform depths and thus overcome the objections to hand-operated controls and other arrangements which are not positive in action and frequently cause strain on the tractor motor, slippage of the tractor tires and stalling of the tractor motor. These objectionable results of controls of the character in common use, are brought about by the soil working implements encountering different soil characteristics, as when plowing in a field, irregularities of soil surface and rocks or other objects in the soil that vary the tension on the implements.

Another object is to provide such penetration control mechanism as may be adjusted or adapted to various makes and models of so-called "direct-connected" implement carrying units and dispensing with any gauge wheels and so-called "helper springs" which may form parts of such units as sold.

These objects may be said to be accomplished through a balancing of the downward pull of the soil working implements, which ordinarily causes them to bury in the ground as they are pulled forwardly therein, by an upward lift exerted upon the beams that connect them to the forwardly moving tractor.

Other objects are to provide such penetration control mechanism which does not require modification of various types of soil working equipment already on the market, and of the type intended for direct connection with the tractor, in order to associate therewith the penetration control mechanism, and constructed in a manner to not interfere with operation of the various types of power or hand operated lifts built as a part of or attached to farm tractors now in common use.

Further objects and advantages will appear in the following detailed description of two practical embodiments of the invention, taken in connection with the accompanying drawings, forming a part of this specification, and in which drawings:

Fig. 1 is a view in side elevation showing one form of the penetration control mechanism associated with a farm tractor and a soil working attachment of the direct-connected or integral-mounted type quite common in the art, a changed position of the mechanism and attachment being shown by dash lines.

Fig. 2 is a perspective view of the penetration control mechanism of Fig. 1, parts of the soil working attachment and parts of the farm tractor, the latter being shown by dot and dash lines.

Figs. 3 and 4 are views similar to Figs. 1 and 2, respectively, but showing a modification of the penetration control mechanism associated with a different form of soil working attachment.

Figs. 5, 6 and 7 are enlarged vertical sectional views on the lines 5—5, 6—6 and 7—7, respectively, of Fig. 1.

Fig. 8 is a fragmentary enlarged vertical sectional view on the line 8—8 of Fig. 3.

Fig. 9 is a vertical sectional view on the line 9—9 of Fig. 8.

Fig. 10 is a fragmentary sectional detail view, partly in elevation and partly in vertical section, showing a suitable bearing for supporting movable parts of penetration control mechanism located at the forward portion of the tractor, and to take the place of the conventional type of bracket usually provided for connection of various types of direct-connected or integral-mounted soil working attachments, with the tractor.

Fig. 11 is an enlarged sectional view on the line 11—11 of Fig. 10.

In the drawings I have shown a type of farm tractor 12, now in common use, which includes longitudinally extending frame members 13, relatively small ground wheels 14 at its forward portion 15 and relatively large, widely spaced, ground wheels 16 at its rearward portion 17, carried by a rear axle assembly 18. Power of an engine 19 is transmitted to the wheels 16 in any approved manner, not shown in the drawings and these wheels are usually provided with rubber tires 20. The tractor may be provided with any suitable lift 22, either power or manually operated, for a suitable soil working attachment 24 of the direct-connected or integral-mounted type of which there are many. Generally speaking, such attachments 24 include a beam 25 as shown in Fig. 1, or a beam 26 as shown in Fig. 3, extending longitudinally of the tractor from its forward portion 15 toward its rearward portion 17 and usually beyond the latter, where it carries one or more soil working implements 28 such as a plow of the moldboard type as shown, although such is merely by way of example, the present invention being adapted for use with many types of attachments of this character, where the soil working implement is of the type tending to bury itself, unless otherwise restrained, in the soil as a result of forward movement of the tractor. In the example shown the soil working implement, of which there may be many, is detachably secured by suitable clamp means 29 to a tool bar 30 in the well known manner. Most of the soil working attachments 24 each have two of such beams 25 shown in Fig. 2 or two beams 26, as shown in Fig. 4, which extend at each side and longitudinally of the tractor.

Especially in Figs. 1 and 2, penetration control mechanism 31, according to the present invention is disclosed in operative relation to the farm tractor 12 and a soil working attachment 24 in which each beam 25 has a substantially straight, horizontal major section 33 extending from the forward portion 15 of the tractor, beneath the rear axle housing 18, a minor upwardly and rearwardly inclined section 34, and a minor substantially horizontal stub section 35 to which the tool bar 30 is secured.

The penetration control mechanism 31, broadly speaking, comprises first means 38, for each beam 25, carried by the forward portion 15 of the tractor, movably pivoting the forward end portion of its respective beam to swing upwardly and downwardly therefrom and for limited movement toward the front and rear portions of the tractor, as shown by full and dash lines in Fig. 1; second means 40 carried by the rearward portion of the tractor and including a suspension element 41 for the rearward portion of the beam, this second means constructed and arranged to move the suspension element upwardly and downwardly, and hence in such movement also swing the beam 25 upwardly and downwardly with respect to its pivotal connection 75 with means 38, as indicated by full and dash lines in Fig. 1; and motion transmitting means 42 operatively connecting the first means 38 and second means 40 for imparting an upward movement to the suspension element 41 upon movement of the beam 25 in a rearward direction with respect to the tractor, due to the forward pull of the tractor, when moving forward, imparted to the soil working implement 28 and burying characteristics of such implement when encountering abnormal resistance to forward movement, and permitting a downward movement of the suspension element 41 upon movement of the beam 25 in a direction toward the front, when the abnormal resistance is relieved. The abnormal resistance referred to may be a more dense section of the soil than is usual, that is, different soil condition, irregularities of the soil surface, rocks or other objects in the soil, etc., that vary the tension on the implement.

Especially in Figs. 3 and 4 the penetration control mechanism 31, is disclosed in operative relation to a farm tractor 12 and a soil working attachment 24 in which each beam 26 has a forward, substantially horizontal, section 44, a rearward, substantially horizontal section 46, to which the tool bar 30 is secured, and an intermediate section 47 between the sections 44 and 46, this section 47 extending diagonally upward and rearward from section 44 to section 46, and located somewhat beneath the rear axle assembly 18.

As a practical example of the first means 38, there are disclosed in the drawings, a bracket 50 to take the place of the usual bracket, not shown in the drawing, provided for attachment to the tractor at the zones of selected holes 51 in the frame member 13, a series of holes being provided to facilitate locating the bracket and suitable bolt means 86 at the desired location; a reversing lever 52, including arms 59 and 61, pivotally supported by a bearing 53 of the bracket 50; and, nut and bolt means 75 pivotally connecting the forward portion of the soil working attachment beam 26 or 27, as the case may be, to the free end of arm 59. As a practical example of the second means 40 there are disclosed a bearing 54 attached to the rearward portion of the tractor; a bell-crank lever 56, pivotally supported by the bearing 54, comprising arms 57 and 62, the arm 57 of which extends in a direction generally longitudinally of the tractor; the aforesaid suspension element 41 connected to and depending from the free end portion of arm 57 by bolt means 65; and a seat member 66 at the free lower portion of suspension element 41 upon which the beam 25 or 26, as the case may be, rests.

In this example of means 38, the arm 61 of the reversing lever 52 is not essential insofar as the support of the beam 25 or 26, as the case may be, is concerned, since, in the example shown it is a part of the motion transmitting means 42 as hereinafter described. In the example of means 40 to move the beam 25 or 26, as the case may be, upwardly and downwardly, the bell-crank arm 62 is also used as a part of the motion transmitting means 42 as hereinafter described.

In the example shown the means 38 and 40 are duplicated at opposite sides of the tractor, since the soil working attachment 24 includes two beams 25 or 26 as the case may be, and as a preferred arrangement the bearings 53 of the brackets 50 are integrally connected, in the form of a tube 58, constituting a hub for each bracket as shown in Figs. 2, 4 and 5, and each reversing lever 52 comprises a depending arm 59 secured to a shaft or coupling member 60 extending through the tube 58 and beyond the ends thereof, and an upstanding arm 61 also secured to the shaft 60. While the arms 59 and 61 are shown in offset relationship at their respective end portion of the shaft, they may be disposed in the same plane when such arrangement will not interfere with operation of parts of the motion transmitting means 42 as hereinafter described.

Each bell-crank lever 56, in addition to the arm 57 includes an arm 62 which is in angular relationship to arm 57 and extends downwardly in the form of invention shown in Figs. 1 and 2 and upwardly in the form shown in Figs. 3 and 4. Also, the bearing 54 for the bell-crank levers 56 may be in the form of a shaft extending crosswise of the tractor, as shown in Figs. 2, 4 and 7 so as to be common to both bell-crank levers.

Various types of suspension elements 41 may be used. I prefer to have the suspension element comprise a rigid link 64, the upper end portion of which is pivotally connected to the free end portion of arm 57 as by bolt means 65 shown in Fig. 6, and the lower portion of which link carries a seat member 66, shown in Figs. 2, 3, 4, 6, 8 and 9, upon which rests the beam 25 or 26, as the case may be, of the soil working attachment 24. In the form of invention shown in Figs. 1, 2 and 6, the seat member is a tube 68 common to each of the beams 25, the tube being revoluble on a shaft 69 carried by the free end portions of the links 64, as shown in Fig. 6, while in the form of invention shown in Figs. 3, 4, 8 and 9, a shaft 71, common to both links 64, and carried by and extending beyond the outer sides of the lower portions of links 64, carries revoluble sleeves 72 as seat members upon which the beams 26 freely rest.

In both these forms the beams of the soil working attachments have a limited degree of sidewise movement, which is possible due to flexing of the beams, and in both of these forms the beams 25 and 26 are free to move upwardly with respect to the seat members 66, responsive to operation of the usual lift 22.

Referring now to suitable motion transmitting means 42, in addition to including the arm 61 of reversing lever 52 and the arm 62 of bell-crank lever 56 it comprises a link 76 pivoted to the free ends of these arms as by bolt and nut means 78 and 79, respectively. The link 76 may be rendered adjustable as to length by a turnbuckle 80 operatively connected to the adjacent ends of link members 81 and 82 as shown in Figs. 1–4. By rendering the link 76 adjustable as to length, and especially by use of the turnbuckle, a fine adjustment may be accomplished, according to the weight coming upon the seat members 66 and the desired depth at which it is desired to have the soil working implements 28 penetrate the soil during normal operation. However other arrangements for adjustment may be provided, such as a series of holes 83 in the free end portion of each arm 62, through a selected hole of which the bolt means 79 may extend, as shown in Fig. 7, to vary the effect of the means 38 upon the means 40, through the means 42; and a series of holes 84 in the free end portion of each arm 57, through a selected hole of which the bolt means 65 may extend, to vary the amount of lift imparted to the attachment beam upon operation of the means 38, 40 and 42.

The bracket 50 may be made adjustable to facilitate attachment of it to the tractor, as by bolt means 86, according to the spacing of the holes 51 in the tractor frame member 13. This arrangement also permits of slight adjustment of the bearing 53 of the bracket toward or from the tractor frame member 13. In the example shown, the bracket 50 is of substantially V-shape, having a lower vertex portion 87 and upwardly and outwardly diverging arms 88 and 89, extending therefrom. The arm 89 is separable from the vertex portion and arm 88, but adjustably secured thereto by bolt means 90 extending through suitable aligned holes 92 and 93 in the lower end of arm 89 and in a lug 91 respectively, the lug extending laterally of the vertex portion 87, shown in Fig. 10. Bolt means 86 is provided for the upper end portion of each of the arms 88 and 89. With soil working attachments 24, now on the market a variety of brackets similar to this bracket 50 are available for use with various makes and models of farm tractors. They are usually made of one piece, and likewise the bracket 50 may be made of one piece, if desired. However, the brackets associated with the present invention do not extend below the tractor frame 13 to the zone in which those commonly used extend, since the arm 59 of the reversing lever 52 disposes the bolt means 75 at approximately the position of connection of the attachment beams 25 or 26, as the case may be, to the conventional brackets.

The operation of the agricultural machine comprising the tractor 12, soil working attachment 24 and the penetration control mechanism 31 is perhaps self evident from the foregoing description, however, certain advantages of the present invention are pointed out in the following brief description of the operation.

In Figs. 1 and 3 the beams 33 of the soil working attachment are shown in full lines in raised position, as by the lift 22, with the soil working implements 28 above the surface of the soil, and so that the machine may be moved from place to place without working the soil. When it is desired to work the soil, the lift 22 is operated to permit the implements 28 to enter the soil. The weight of the attachment beams, the force of gravity, and the inherent characteristics of the soil working implements 28 to bury themselves in the soil (sometimes referred to as the suction) will actuate means 38, 40 and 42 to the approximate position shown by dash lines in Figs. 1 and 3, assuming that the implements 28 have penetrated the soil to the desired extent and normal soil is encountered by the implements. With the parts in the position last described, the downward pull of the soil working implements may be said to be balanced by the upward lift exerted upon the beams of the soil working attachment. If the implements 28 encounter abnormal conditions of the soil, such as tend to cause them to bury themselves to an extent greater than desired, a rearward pull or lagging of the beam with respect to the forwardly moving tractor will actuate the means 38, 40 and 42 in such manner as to create a lifting action at the suspension element 41 and in effect maintaining the soil working implements 28 in substantially the selected zone of operation in the soil. This lifting action applies a downward thrust on the tractor wheels 16 through the tractor frame and rear axle assembly 18 and preventing spinning of the wheel and burning of the tires 20 in comparatively dry soil.

Thus the penetration control mechanism 31, among other things, saves time and labor, avoids the possibility of the implements 28 burying to the extent that the entire equipment is stopped as by stalling of the engine 19, or slipping of the tires 20, is simple in construction, and easy to understand, adjust and maintain in good repair.

While adjustments to render the penetration control mechanism most efficient may best be made as a result of actual tests in the field, under operating conditions, since the weight of different makes and models of soil working attachments 24 vary considerably, soil conditions vary and the amount of drag on the beams of the attachments vary accordingly as well as the work to be done by the soil working implements 28, generally speaking, the following adjustments bring about the results indicated.

An adjustment of the upper end of suspension element 41 toward the axis of rotation of bell-crank lever 56 will increase the upward lift and cause the soil working implements to operate at a shallower depth and vice versa. An adjustment of the rear end of link 76 toward the axis of rotation of bell-crank lever 56 will decrease the upward lift, and vice versa. As previously stated, fine adjustments according to the weight of the soil working attachment, characteristics of the soil and the extent of penetration of the soil working implements may be accomplished by use of adjustable characteristics of the link 76, i. e., the turnbuckle 80, in the example shown.

The main reasons for the two types of penetration control mechanisms shown in Figs. 1 and 2, and Figs. 3 and 4 are to provide assemblies to meet varying conditions encountered in adapting them to particular makes and models of tractors, and incidently to the characteristics of the attachment beams, such as those designated 25 and 26. The form shown in Figs. 1 and 2 may aptly be termed an "under-axis" type suitable for use with farm tractors having large fly-wheels, links and levers, etc., in the zone above the rear axle assembly which would interfere with use of the form shown in Figs. 3 and 4, which latter may aptly be termed an "over-axis" type. On the other hand, the over-axis type is useful when the tractor has some underslung gear which would interfere with use of the under axis type. Also there are instances where the attachment beams 25 render the under-axis type most suitable because of the long major sections 33 thereof running substantially straight from the zone of connection at the forward portion of the tractor to beyond the rearward portion thereof. On the other hand, the over-axis type may be most suitable for a soil working attachment having beams such as those designated 26, where the most appropriate zone of engagement between the beams and their respective seat members 66, are the rearward sections 46 of such beams, since the slanting intermediate sections 47 are in zones beneath the rear axle assembly 18.

I claim:

1. In an agricultural machine of the class wherein a farm tractor has connected thereto a soil working attachment of the direct-connected type including a beam extending longitudinally of the tractor from its forward portion to at least its rearward portion and which beam supports at least one soil working implement of the type tending to bury itself in the soil as a result of forward movement of the tractor; the combination of first means at the forward portion of the tractor movably pivoting the forward end portion of the beam to swing upwardly and downwardly therefrom and for limited movement toward the front and rear portions of the tractor, second means at the rearward portion of the tractor including a pendant suspension element provided with a seat member upon which the rearward portion of said beam freely rests for reciprocation thereon, said second means constructed and arranged to move its said suspension element upwardly and downwardly, and motion transmitting means operatively connecting said first and second means for imparting an upward movement to said suspension element upon movement of the beam in a rearward direction with respect to the tractor due to the forward pull of the tractor, when moving forward, imparted to the soil working implement and the burying characteristics of the latter when encountering abnormal resistance to forward movement, and permitting a downward movement of said suspension element upon movement of the beam in a direction toward the front portion of the tractor when said abnormal resistance is relieved.

2. In an agricultural machine of the class wherein a farm tractor has connected thereto an attachment of the direct-connected type including a beam extending longitudinally of the tractor from its forward portion to at least its rearward portion and which beam supports at least one soil working implement of the type tending to bury itself in the soil as a result of forward movement of the tractor; the combination of a first bearing carried by the forward portion of the tractor, a reversing lever pivotally supported by said first bearing with the forward portion of said beam connected to one of the arms of said reversing lever, a second bearing attached to the rearward portion of the tractor, a bell-crank lever pivotally supported by said second bearing, one arm of said bell-crank lever extending in a direction longitudinally of the tractor, and disposed for up and down movement, a suspension element depending from the free end portion of said last mentioned arm and having its lower end portion slidably supporting said beam, and a link connecting the other arms of said reversing and bell crank levers.

3. The machine as specified in claim 2 in which said link includes means for adjusting it longitudinally to different lengths for varying the amount of lift imparted to said beam upon operation of said reversing and bell crank levers.

4. The machine as specified in claim 2 in which said suspension element comprises a link depending from the free end portion of said last mentioned arm, and a seat member carried by the lower end portion of said link, upon the upper surface of which seat member said beam freely rests.

5. The machine as specified in claim 4 in which said link depending from the free end portion of said last mentioned arm is adjustable to different positions toward and from the hub of the bell-crank lever for varying the amount of lift imparted to said beam upon operation of said levers.

References Cited in the file of this patent
UNITED STATES PATENTS

| | | |
|---|---|---|
| 2,239,332 | Mee | Apr. 22, 1941 |
| 2,371,839 | Orelind | Mar. 20, 1945 |
| 2,372,459 | Todd | Mar. 27, 1945 |
| 2,462,641 | Hyland | Feb. 22, 1949 |
| 2,626,551 | Starr | Jan. 27, 1953 |
| 2,668,489 | Silver et al. | Feb. 9, 1954 |